J. A. Wright,
Cotton Planter.

No. 113,383.  Patented Apr. 4, 1871.

Witnesses:
A. Bennewendorf.
Wm. H. C. Smith.

Inventor:
J. A. Wright
Per Munn & Co.
Attorneys.

United States Patent Office.

JAMES A. WRIGHT, OF MARIETTA, GEORGIA.

Letters Patent No. 113,383, dated April 4, 1871.

IMPROVEMENT IN COMBINED COTTON-SEED PLANTERS AND CULTIVATORS.

The Schedule referred to in these Letters Patent and making part of the same.

*To all whom it may concern:*

Be it known that I, JAMES A. WRIGHT, of Marietta, in the county of Cobb and State of Georgia, have invented a new and useful Improvement in Combined Cotton-Seed Planter and Cultivator; and I do hereby declare that the following is a full, clear, and exact description thereof, which will enable others skilled in the art to make and use the same, reference being had to the accompanying drawing forming part of this specification, in which—

Similar letters of reference indicate corresponding parts.

My invention has for its object to furnish an improved machine which shall be simple in construction and effective in operation, being so constructed that it may be used for planting the crop and afterward cultivating it; and It consists in the construction and combination of the various parts of the machine, as hereinafter more fully described.

A is the beam, to the forward end of which the draft is attached, and to the middle part of which is attached the lower ends of the handles B.

C is a standard, the lower end of which is attached to the rear end of the beam A, and through the upper end of which passes a round, $b'$, which also passes through the handles B to support them and hold them in their proper relative position.

D is the plow that opens the furrow to receive the seed, and which is attached to the lower end of the standard E, the upper end of which is securely bolted to the beam A.

The standard E is strengthened against the draft-strain by the brace $e'$, formed upon or attached to the upper part of the said standard, and the upper end of which projects forward and is bolted to the beam A.

F is a wheel, which is pivoted to and between the lower ends of the bars G, the upper ends of which are bolted to the beam A.

The upper ends of the bars G have two or more holes formed in them to receive the bolt by which they are secured to the beam A, so that they may be lengthened or shortened as it is desired to have the plows work deeper or shallower in the ground.

The wheel F supports the weight of the stock, and is so arranged as to follow the furrow opened by the plow D.

Figure 1:
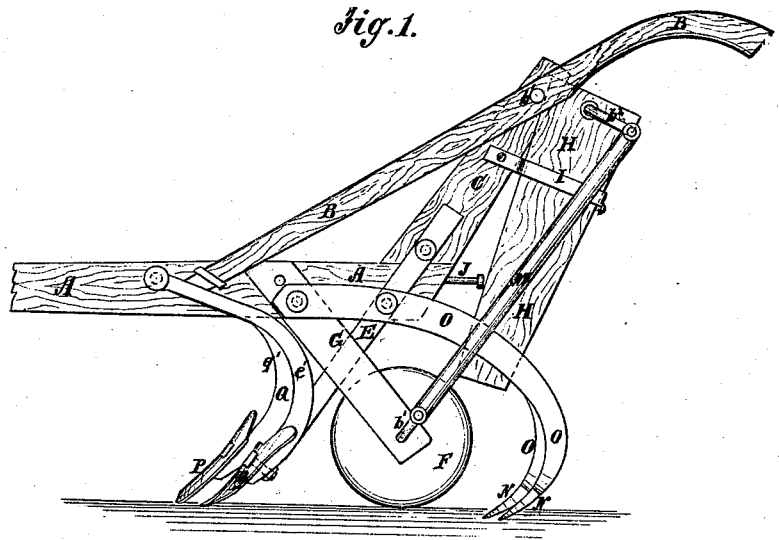
Figure 1 is a side view of my improved planter and cultivator.
Figure 2:
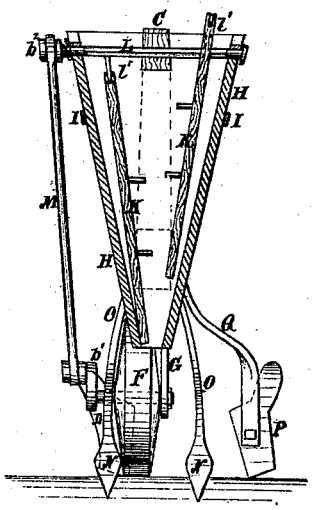
Figure 2 is a rear view of the same, partly in section, through the seed-hopper.

H is the seed-hopper, which is made deep and narrow and hopper-shaped, or with inclined sides, as shown in figs. 1 and 2.

The hopper H is supported by an iron band or strap, I, which passes around the upper part of the hopper H, and the ends of which are attached to the upper part of the standard C.

The upper edge of the forward side of the hopper H is notched to receive the rear side of the upper end of the standard C, to steady the hopper.

The lower end of the hopper H is held to the rearward, so as to bind it between the band I and upper end of the standard C by the bolt or pin J, attached to the rear end of the beam A, and the rear end or head of which rests against the forward side of the lower part of the said hopper H, as shown in fig. 1.

This construction allows the hopper to be conveniently detached, when desired.

An iron band adjusted by a screw may be used upon the lower end of the hopper H for regulating the escape of the seed.

K are two bars passing down through the interior of the hopper H, and which have pins or teeth $k'$ attached to them.

The bars K $k'$ are designed to keep the cotton-seed stirred up and to push it out through the open bottom of said hopper.

The upper ends of the bars K are pivoted to short cranks $l'$, formed upon the opposite sides of the shaft L, which passes across the upper part of the hopper H, and the journals of which work in bearings in the upper part of the sides of the said hopper.

To a projecting end of the shaft L is attached, or upon it is formed, a crank, $l^2$, to which is pivoted the upper end of the connecting-rod M, the lower end of which is pivoted to the crank $f'$, formed upon or attached to the projecting end of one of the journals of the wheel F, so that the stirrer may be operated by the advance of the machine.

N are the covering-plows, which are formed upon or attached to the lower ends of the curved standards O, the upper ends of which project forward and are securely bolted to the rear end of the beam A.

As hereinbefore described, the machine is a cotton-seed planter.

When it is to be used as a cultivator the seed-dropping device may be detached and a fourth plow, P, is used.

The plow P is attached to the lower end of the standard Q, the upper end of which is attached to the beam A, and the draft-strain upon which is sustained by the brace $q'$ formed upon or attached to the said standard, and the upper end of which is secured to the beam A.

The standard Q is bent laterally, as shown in fig. 2, to bring the plow P into proper position with respect to the other plows D N N.

The curved standards to which the plows are attached can be adjusted wider apart or closer together, at pleasure, by putting leather nuts or washers upon the bolt that holds the said standards to the stock upon the inside of the iron nuts.

Having thus described my invention,

I claim as new and desire to secure by Letters Patent—

1. The combination of the beam A, handles B, standard C, furrowing-plow D E $c'$, wheel F, adjustable bars G, seed-hopper H, band I, pin or bolt J, toothed stirrers K $k'$, cranks $l^1$ $l^1$, shaft L, crank $l^2$, connecting-rod M, crank $f'$, and covering-plows N O, with each other, substantially as herein shown and described, and for the purpose set forth.

2. The combination of the plow P Q $q'$ with the beam A, handles B, standard C, plow D E $e'$, plows N O, and adjustable gauge-wheel F G, substantially as herein shown and described, and for the purpose set forth.

JAMES A. WRIGHT.

Witnesses:
  B. GUTLEY,
  J. M. WILSON.